Oct. 23, 1962 W. S. PLUMMER 3,059,400
ROTATING CUTTING MEMBER
Filed Aug. 26, 1960 3 Sheets-Sheet 1

INVENTOR
Wade S. Plummer

BY
Peck & Peck
ATTORNEYS

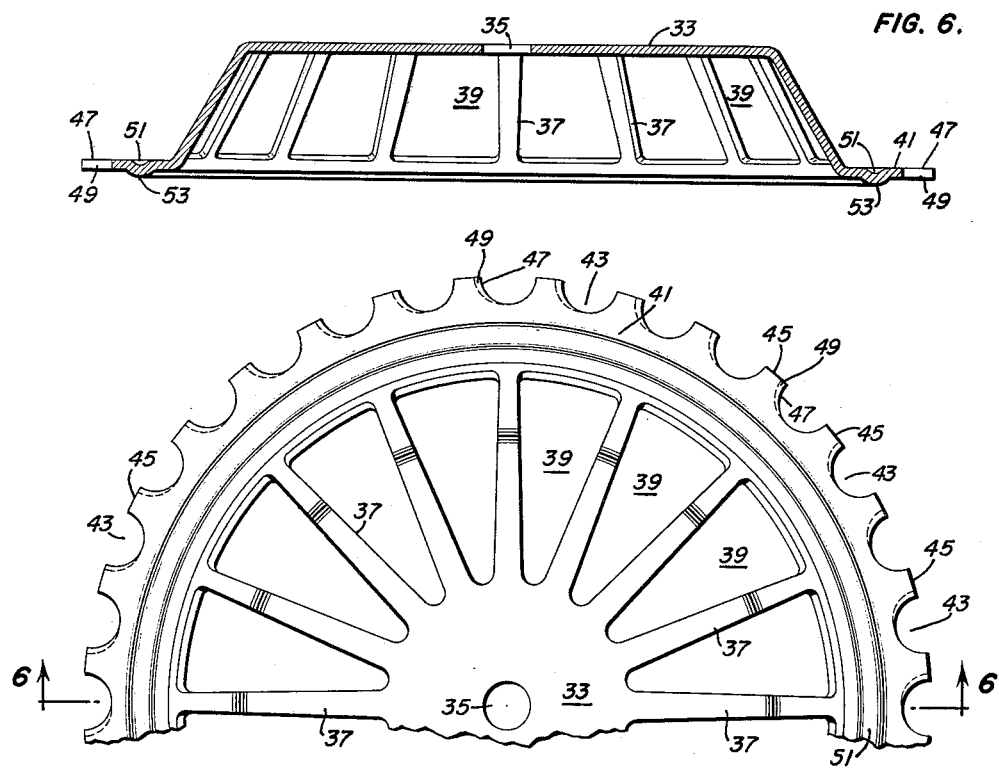

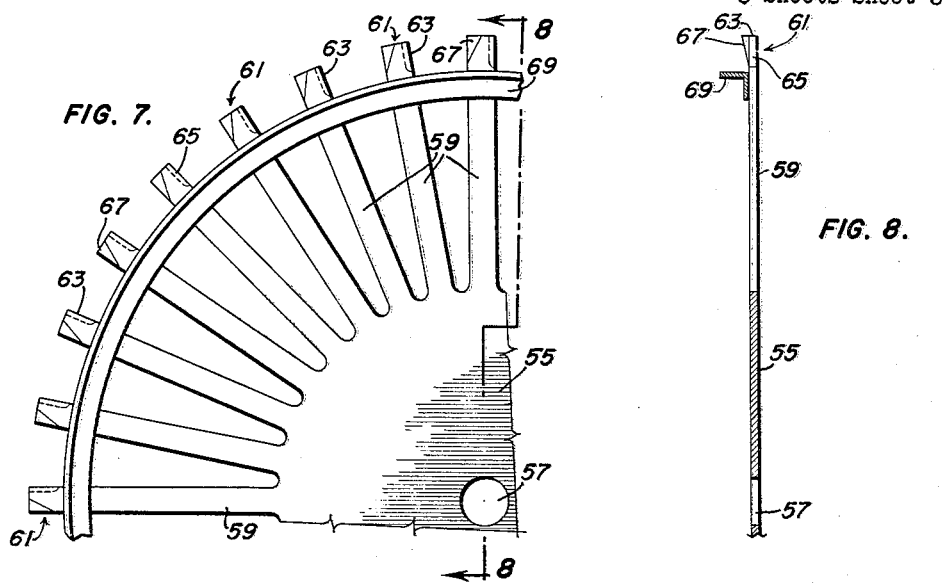
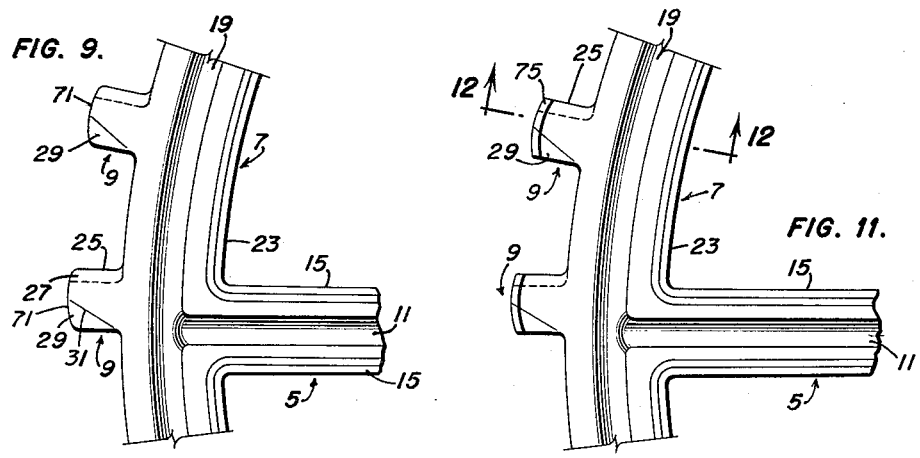
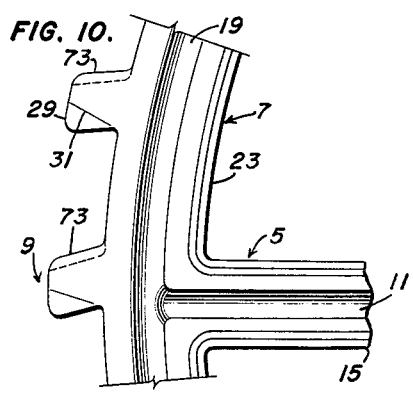

United States Patent Office 3,059,400
Patented Oct. 23, 1962

3,059,400
ROTATING CUTTING MEMBER
Wade S. Plummer, Falls Church, Va., assignor to Somar Industries, Inc., Washington, D.C., a corporation of Maryland
Filed Aug. 26, 1960, Ser. No. 52,298
5 Claims. (Cl. 56—295)

This invention relates broadly to the art of rotary cutting members for power mowers, and in its more specific aspects it relates to such rotary cutting members which have been designed to provide unusual safety, strength, mobility, economy, and other desirable features; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

With the increasingly widespread use of power mowers has come a corresponding increase in injuries to the operators of the mowers, and in many cases to persons in the relative close vicinity of the operating mower. Power mowers are now often used by inexperienced and careless adults and also are often operated by children. Present power mowers do not generally have safety features built into them to prevent injuries to the operators thereof and others who may be nearby.

It is therefore one of my prime purposes to provide a rotary cutting member for a power mower which has safety features built into it which are practical and are effective in substantially reducing the possibility of a person's extremities coming into contact with the cutting edge of the blade or blades of a rotary.

In devising a safe rotary cutting member for a power mower I have not sacrificed cutting ability or efficiency for safety; instead I have so combined the two concepts structurally to provide a more efficient cutting member and one which is substantially safer than any previous cutting member of which I am aware.

The rotary cutting member of this invention comprises generally a member which is adapted to rotate on a vertical axis and comprises a plurality of circumferentially spaced elements projecting radially from the periphery of the member. Each such radial projection carries thereon a cutting blade and each blade is formed by a bevel in such manner that the cutting edge is uppermost or on a horizontal plane with the upper surface of the projection. This construction constitutes a unique advance in this art, introducing a substantial safety feature into the cutting member and the blades thereof. In conventional blades the cutting edge is in the downward position, that is, the bevel extends downwardly and forwardly as opposed to my construction where the cutting edge is uppermost and the bevel extends upwardly and forwardly. This difference in the positioning of the cutting edge is significant for it places the cutting edge out of position for cutting a person's extremity were it beneath the rotary cutting member. Not only does this positioning of the cutting edge of the blade, as described, remove it from the injuring area, but the location of the bevel is such that the blade will tend to ride up on relatively small obstructions or the like, and the edge will not engage them and become dull or broken.

A further safety factor of my rotary cutting member is provided by the circumferential spacing of the projections or blades which extend radially outwardly from the rim or periphery of the member. I have spaced each projection or blade from the next adjacent projections or blades approximately two inches and I have found that this results not only in excellent cutting of the growth, but also eliminates the possibility of a person's foot being inserted between the blades where it would be cut or otherwise injured. It is within my contemplation to vary the spacing between adjacent projections or blades from that mentioned; however, I do not intend to enlarge such spacing sufficiently to receive a human foot between the blades, for instance. For safety and other reasons such spacing should not exceed three and one-half inches.

I have devised a rotary cutting member for a power mower which may be made in a single stage stamping or pressing operation. The resultant cutting member is relatively light in weight and is economical to produce and may be manufactured under mass production methods. A relatively light rotary cutting member is desirable for a number of reasons and is advantageous over prior cutting members because it substantially reduces momentum.

From my experience with power mowers I have found that blades are frequently broken or damaged by obstructions over which I have evolved a rotary cutting member which consists of a hub, a plurality of spokes radiating therefrom, a rim and the plurality of projections which project radially therefrom to provide a lightweight stamping. My rotary cutting member is not only light in weight, but it is also strong and rigid for I have provided means which increases the rigidity of the components of the wheel. I have so formed and constructed the rigidifying means that they serve a dual function: that of lending rigidity to the member and also serving to engage relatively small obstructions and cause the member to ride over them rather than engaging them with a blade damaging impact.

I have provided unique structure on the spokes of the cutting member which not only decrease the danger of injury upon impact on an extremity, but also functions to blow the cuttings away from the spokes instead of clinging thereto.

It is also within my contemplation to increase the safety factor of the rotary cutting member by not only providing the cutting edge in uppermost position, but also by configuring the outermost edge of each projection or blade so that its damaging impact on a person is greatly reduced and it will act to move obstructions from the path of the mower.

In one form of my invention I have followed the principle of forming the cutting edge uppermost on the blade while locating the blades, including the cutting edges in recesses or notches in the rim of the rotary cutting member.

In one form of my invention I provide a rotary cutting member produced by a stamping operation which is of dished construction which provides a more rigid cutting member of lightweight construction.

I have also provided a projection or blade construction which reduces and relieves stress concentration at the juncture of each projection or blade with the rim.

In another form which my invention may take the rotary cutting member comprises a hub from which a plurality of elongated blade supporting elements radiate.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 5 is a top plan view of a modified form of rotary cutting member with parts thereof broken away.

FIG. 6 is a vertical sectional view taken on line 6—6 of FIG. 5.

FIG. 7 is a top plan view of a further form of rotary cutting member with parts thereof broken away.

FIG. 8 is a view taken on line 8—8 of FIG. 7.

FIG. 9 is a fragmentary view illustrating projections or blades having a curved outer edge.

FIG. 10 is a fragmentary view illustrating the cutting edges of the blades extending from the rim providing an included angle greater than 90°.

FIG. 11 is a fragmentary view illustrating the blades having an upturned outer peripheral edge.

FIG. 12 is a view taken on line 12—12 of FIG. 11.

Figure 1:
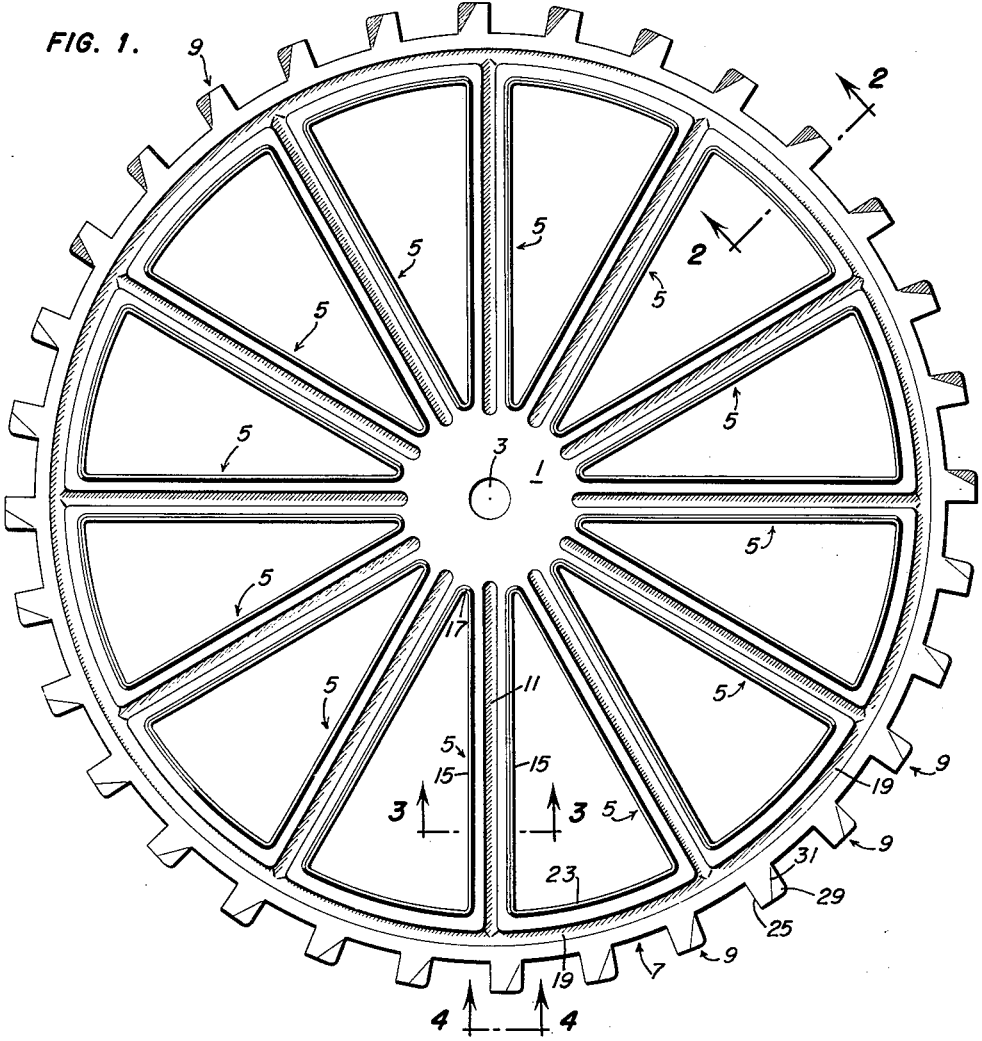
FIG. 1 is a top plan view of the preferred form of rotary cutting member.
Figure 2:
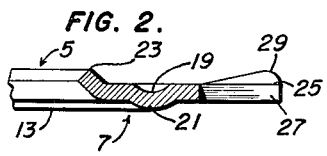
FIG. 2 is a view taken on line 2—2 of FIG. 1.

In the accompanying drawings, and particularly FIGS. 1 through 4 thereof, I have disclosed my rotary cutting member as comprising a hub 1 having a central aperture 3 therein which is adapted to receive the drive shaft of the power mower for causing rotation of the member. The rotary cutting member is operatively fixed to the drive shaft in any suitable and conventional manner, and since such connecting means comprises no part of this invention, it has not been shown in the drawings.

I provide a plurality of spokes designated generally by the numeral 5 which are of the same length and radiate from the central hub 1. The outer ends of the spokes are connected by a rim designated generally by reference numeral 7 and I provide a plurality of projecting blades designated generally by numeral 9, which blades are circumferentially spaced apart approximately two inches and extend radially outwardly from the rim.

The rotary cutting member comprising the hub, spokes, rim and blades, is preferably produced by a single stamping operation to provide an integral unitary structure having structural details which I shall now describe.

Each spoke 5 is stamped or otherwise formed to provide a longitudinally extending centrally located groove 11 in the upper surface thereof forming a corresponding convex bulge or rib 13 on the under surface of each spoke, which, of course, also extends longitudinally and centrally of each spoke. In the member and spoke forming operation I also form each spoke to provide an upturned lip 15 extending along each longitudinal edge and preferably, though not necessarily, adjacent lips may be connected at the hub by lip 17. The rim 7 is formed with a continuous groove 19 in the upper surface thereof and this groove may, if desired, open into each groove 11 of the spokes. The stamping of the groove or depression 19 in the rim forms a corresponding bulge or convexity 21 on the under side of the rim. Each inner edge of the rim between adjacent spokes is provided with an upturned lip 23. The purposes of the grooves, convexities and lips will become apparent as this description proceeds.

Figure 4:
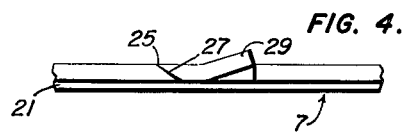
FIG. 4 is a view taken on line 4—4 of FIG. 1.
Figure 3:
FIG. 3 is a view taken on line 3—3 of FIG. 1.

Each radially projecting blade 9 comprises a leading cutting edge 25, which as is clearly disclosed in FIG. 4, is uppermost and in the plane of the upper surface of the projecting blade 9 due to the bevel 27 being formed to extend upwardly and forwardly. At its trailing edge each projecting blade 9 is provided with a wing 29 upwardly struck along a diagonal line 31 from the body of the projecting blade.

In the operation of a power mower provided with a rotary cutting member, as disclosed in FIGS. 1 through 4 of the drawings, the member will rotate in a horizontal plane on a vertical axis and the plurality of individual, independent and circumferentially spaced radially projecting blades will provide multiple cutting action, cutting a clean swath through the growth being cut. No blades of the growth will remain standing. This full multiple cutting action does not occur with the conventional two-bladed rotary cutter which is now commonly used and my multiple cutting action cutting wheel constitutes a substantial advance over prior cutters of which I am aware. It will be understood that a better cutting action is obtained if the blades of the growth are upstanding when engaged by the cutting edge of the blade. The wings 29 on the projecting blades generate a stream of air or suction to cause the blades of grass to stand up in front of the cutting edge 25 of each blade.

As I have stated, I preferably space the projecting blades 9 approximately two inches apart which eliminates the possibility of one's foot being inserted between the blades in the path of the cutting edge. It will be further recognized that by arranging the cutting edge 25 so that it is located uppermost, the possibility of danger to a person's foot or hand which might be positioned below the member is substantially lessened. This particular location of each cutting edge also reduces the chance of blade injury due to impact with an obstruction.

It is common knowledge that obstructions on the ground, such as stones, sticks and the like, constitute a real hazard to the operator of the mower and also cause damage and breakage to the blades and even to other operating components of the apparatus. It is also a fact that a rotary cutting member should be substantially rigid and strong. The spoke grooves 11 and bulges 13 and the groove 19 and corresponding bulge 21 in the rim 7 serve a dual function for they provide rigidity to their respective components and the bulges, depending ribs or convexities 13 and 21 form means adapted to engage and ride over obstructions thereby lifting the member and the blades out of position to engage the obstructions and eliminating the chance of blade damage. Since the depending convex bulges are curved, they will ride over obstructions instead of sharply engaging or wedging against them which might cause damage, and they will not throw them. It will be noted that bulges 13 and 21 depend in a plane below the blades 9 so that the bulges will come into contact before the blades do.

Relatively sharp edges will tend to cause cuttings to cling to them and for this reason I have formed the upturned lips 15 and 23 on the spokes and rim, respectively. These lips also involve a safety factor for they reduce the chance of injury if a person's extremity is struck by them.

In FIGS. 5 and 6 I have illustrated another form of rotary cutting member which is of dished construction to lend strength and rigidity thereto and may be produced in a single stage stamping operation. This type of rotary cutting member comprises a hub 33 having a shaft receiving opening 35 centrally therein which is adapted to receive the drive shaft of the mower. A plurality of spokes 37 extend downwardly and outwardly from the hub and are of tapering form to provide openings 39 therebetween which are of outwardly diverging shape. An annular flange or rim 41 connects the outer ends of the spokes, the flange being formed to extend in a plane substantially parallel to the plane of the hub 33. The outer peripheral edge of the flange 41 is formed with a plurality of notches or recesses 43 forming between them a plurality of blades 45. The leading edge of each blade is sharpened, forming a cutting edge 47 which is uppermost due to the bevel extending forwardly. The outer peripheral edge of the flange 41 is formed with a continuous groove 51 on its upper surface and with a corresponding continuous convex bulge 53 on its lower surface.

As in the construction described in connection with the preferred form of my invention, the convex bulge 53 depends in a plane below blades 45 and will ride over obstructions lifting the member and blades out of position where such obstructions would be engaged. The locating of the cutting edges of the blades in the recesses or notches is protective to both the blades and to persons in the vicinity of the power mower. The blades 45 may, if desired, be formed to provide on their trailing edges, wings similar to the wings 29 (FIGS. 1 through 4) and such wings would serve the same purpose.

In FIGS. 7 and 8 of the drawings I have illustrated a further modification of rotary cutting member. In this form of my invention I provide a hub 55 having a drive shaft receiving aperture 57. A plurality of blade supporting bars 59 radially extend from the hub and on its outer end each bar 59 is formed to provide a blade designated generally by the numeral 61. Each blade has a cutting edge 63 formed in its leading edge, the cutting edge being uppermost due to the bevel 65 extending forwardly and upwardly. Upstanding wings 67 are formed on each blade, the wings being adapted to perform the same function as wings 29 (FIGS. 1 through 4). I provide an annular angle member 69 which is welded to each bar 59 adjacent to but inwardly spaced from the blade forming end of each bar. It will be appreciated that the blades provide the safety feature of the uppermost cutting edge and it will be appreciated that the angle member reinforces and strengthens the assembly.

FIG. 9 illustrates a blade which may be used with the forms of the invention shown in FIGS. 1 and 7. In this form of my invention I have used the same numerals as used in describing FIG. 1 for similar parts. I provide the blade 9 projecting from rim 7 which connects the ends of spokes 5. The blade includes the uppermost cutting edge 25 and I form the outer edge 71 of each blade 9 of curved construction. I have found this structure to cause less damage or injury in case of impact.

FIG. 10 also illustrates a blade which may be used with the wheels of FIGS. 1 and 7 and again the same reference numerals have been used to designate similar parts. The blade of FIG. 11 extends from the rim 7 at an angle which provides an included angle between cutting edge 73 and periphery of the rim which is greater than 90°. Thus the cutting edge 73 is angled with respect to its path of movement.

FIGS. 11 and 12 provides a safety feature on the outer edge of each blade 9 which is not disclosed in the previously described forms of my invention. I provide an upturned lip 75 on the outer edge of each blade 9. This lip provides excellent means to reduce injury upon impact and to ride over obstructions.

I claim:

1. A cutting member adapted to rotate on a vertical axis, said cutting member including a hub, a rim and means connecting said rim to said hub, a plurality of blades projecting radially outwardly from the periphery of said rim and said blades being circumferentially spaced apart, and each of said blades having a cutting edge on the leading edge thereof, and a continuous convex bulge depending from the under surface of said rim adapted to ride up on obstructions in the growth being cut and to rigidify said rim.

2. A cutting member in accordance with claim 1, wherein said means connecting said rim to said hub comprises a plurality of spokes and each of said spokes is provided with a continuous convex bulge depending from the under surface thereof adapted to ride up on obstructions in the growth being cut and to rigidify said spokes.

3. A cutting member in accordance with claim 2, wherein the longitudinal edges of said spokes and the inner edge of said rim are upturned.

4. A cutting member in accordance with claim 1, wherein the major portion of each blade extends in the radially projected plane of the rim and the outermost edge of each blade is upturned.

5. A cutting member adapted to rotate on a vertical axis, said cutting member including a hub, a plurality of spokes radiating from said hub and a rim connecting the outer ends of said spokes, a plurality of blades projecting radially outwardly from the periphery of said rim and said blades being circumferentially spaced apart, and each of said blades having a cutting edge formed on the leading edge thereof, said rim being provided on its upper surface with a continuous groove therein and on the under surface with a corresponding continuous convex bulge, and each of said spokes being provided on its upper surface with a continuous groove therein and on its under surface with a corresponding continuous bulge, said grooves and bulges rigidifying said rim and said spokes, and said convex bulges being in a horizontal plane below the horizontal plane of said cutting edges and adapted to ride up on obstructions in the growth being cut.

References Cited in the file of this patent
UNITED STATES PATENTS

| | | |
|---|---|---|
| 2,475,716 | Nabors | July 12, 1949 |
| 2,724,229 | Graham | Nov. 22, 1955 |
| 2,833,101 | Batton | May 6, 1958 |
| 2,859,581 | Kroll et al. | Nov. 11, 1958 |
| 2,867,963 | Lawrence et al. | Jan. 13, 1959 |
| 2,975,579 | Balkus et al. | Mar. 21, 1961 |